United States Patent
Niermeyer et al.

(10) Patent No.: US 7,469,932 B2
(45) Date of Patent: *Dec. 30, 2008

(54) RECEPTOR FOR A SEPARATION MODULE

(75) Inventors: J Karl Niermeyer, Tyngsboro, MA (US); Marc Laverdiere, Wakefield, MA (US); Ralph J. Stankowski, Westford, MA (US); Joseph Smith, North Andover, MA (US)

(73) Assignee: Entegris, Inc., Chaska, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/599,195

(22) Filed: Nov. 14, 2006

(65) Prior Publication Data

US 2007/0102924 A1    May 10, 2007

Related U.S. Application Data

(63) Continuation of application No. 10/489,587, filed as application No. PCT/US02/29107 on Sep. 13, 2002, now Pat. No. 7,163,237.

(60) Provisional application No. 60/322,002, filed on Sep. 13, 2001.

(51) Int. Cl.
*F16L 39/00* (2006.01)
(52) U.S. Cl. .................. 285/26; 285/124.1; 285/124.3; 285/124.4; 210/238
(58) Field of Classification Search .............. 285/124.1, 285/921, 26, 29, 124.3, 124.4; 210/238
See application file for complete search history.

(56) References Cited

U.S. PATENT DOCUMENTS

| 136,631 | A | 3/1873 | Westinghouse |
| 420,209 | A | 1/1890 | Nilson |
| 468,390 | A | 2/1892 | Westerman |
| 872,174 | A | 11/1907 | Fyock et al. |
| 872,707 | A | 12/1907 | Beahm |
| 891,718 | A | 6/1908 | McMillan |
| 898,214 | A | 9/1908 | Gold |
| 940,334 | A | 11/1909 | Leftwich |
| 967,516 | A | 8/1910 | Harrison |
| 1,070,110 | A | 8/1913 | Brown |

(Continued)

FOREIGN PATENT DOCUMENTS

DE    3100564 A1    8/1982

(Continued)

OTHER PUBLICATIONS

International Search Report for PCT/US02/29107.

(Continued)

*Primary Examiner*—David E Bochna
(74) *Attorney, Agent, or Firm*—Hamilton, Brook, Smith & Reynolds, P.C.

(57) ABSTRACT

A stationary receptor for a separation module is positioned between a pump housing and the separation module. The stationary receptor has a pivot line and two shelves on its outer surface which permit fitting the separation module into the stationary receptor adjacent the pump housing. The separation module has a housing, a filter within the housing and at least one outlet and one inlet, which are positioned to mate with fittings of the pump housing.

4 Claims, 8 Drawing Sheets

U.S. PATENT DOCUMENTS

| | | |
|---|---|---|
| 1,186,068 A | 6/1916 | Benjamin |
| 1,221,682 A | 4/1917 | Coffield |
| 1,389,012 A | 8/1921 | Roberts |
| 1,786,066 A | 12/1930 | Hermann |
| 1,886,398 A | 11/1932 | Harrell |
| 2,997,180 A | 8/1961 | Loveday |
| 3,052,863 A | 9/1962 | Uberbacher et al. |
| 3,107,601 A | 10/1963 | Longmire |
| 3,214,195 A | 10/1965 | Zahuranec et al. |
| 3,399,776 A | 9/1968 | Knuth |
| 3,469,863 A | 9/1969 | Riester et al. |
| 3,485,516 A | 12/1969 | Keller et al. |
| 3,493,115 A | 2/1970 | Koches |
| 3,519,133 A | 7/1970 | Broering |
| 3,560,377 A | 2/1971 | Loeffler |
| 3,628,662 A | 12/1971 | Kudlaty |
| 3,706,184 A | 12/1972 | Tucker |
| 3,727,764 A | 4/1973 | Ogden |
| 3,734,851 A | 5/1973 | Matsumara |
| 3,802,564 A | 4/1974 | Turman |
| 3,812,659 A | 5/1974 | Westergren et al. |
| 3,935,106 A | 1/1976 | Lipner |
| 3,947,080 A | 3/1976 | Ege |
| 3,950,251 A | 4/1976 | Hiller |
| 4,089,549 A | 5/1978 | Vyse et al. |
| 4,174,231 A | 11/1979 | Hobgood |
| 4,247,133 A | 1/1981 | Moller |
| 4,269,219 A | 5/1981 | Dybvig |
| 4,283,284 A | 8/1981 | Schnell |
| 4,298,358 A | 11/1981 | Ruschke |
| 4,321,911 A | 3/1982 | Offutt |
| 4,344,777 A | 8/1982 | Siposs |
| 4,404,103 A | 9/1983 | Drath |
| 4,411,783 A | 10/1983 | Dickens et al. |
| 4,416,775 A | 11/1983 | Halbich et al. |
| 4,494,775 A | 1/1985 | Nash et al. |
| 4,498,989 A | 2/1985 | Miyakawa et al. |
| 4,500,426 A | 2/1985 | Ishii et al. |
| 4,522,717 A | 6/1985 | Brust |
| 4,524,807 A | 6/1985 | Toliusis |
| 4,529,512 A | 7/1985 | Williamson et al. |
| 4,535,997 A | 8/1985 | Brust |
| 4,555,130 A | 11/1985 | McClain |
| 4,559,136 A | 12/1985 | Dockery |
| 4,568,456 A | 2/1986 | van Zon |
| 4,610,781 A | 9/1986 | Bilstad et al. |
| 4,629,475 A | 12/1986 | McArdle et al. |
| 4,629,563 A | 12/1986 | Wrasidlo |
| 4,636,307 A | 1/1987 | Inoue et al. |
| 4,654,142 A | 3/1987 | Thomsen et al. |
| 4,664,420 A | 5/1987 | Demeri |
| 4,698,154 A | 10/1987 | Mohn et al. |
| 4,708,157 A | 11/1987 | Sabatino |
| 4,719,012 A | 1/1988 | Groezinger et al. |
| 4,735,716 A | 4/1988 | Petrucci et al. |
| 4,759,571 A | 7/1988 | Stone et al. |
| 4,806,240 A | 2/1989 | Giordano et al. |
| 4,820,174 A | 4/1989 | Farrar et al. |
| 4,846,800 A | 7/1989 | Ouriel et al. |
| 4,857,189 A | 8/1989 | Thomsen et al. |
| 4,857,191 A | 8/1989 | Wolf |
| 4,861,476 A | 8/1989 | Kohlheb et al. |
| 4,870,961 A | 10/1989 | Barnard |
| 4,879,032 A | 11/1989 | Zemlin |
| 4,900,065 A | 2/1990 | Houck |
| 4,900,449 A | 2/1990 | Kraus et al. |
| 4,904,382 A | 2/1990 | Thomsen |
| 4,932,987 A | 6/1990 | Molina |
| 4,944,776 A | 7/1990 | Keyser et al. |
| 4,964,984 A | 10/1990 | Reeder et al. |
| 4,966,699 A | 10/1990 | Sasaki et al. |
| 5,022,986 A | 6/1991 | Lang |
| 5,041,220 A | 8/1991 | Lee et al. |
| 5,057,131 A | 10/1991 | Lackner et al. |
| 5,066,391 A | 11/1991 | Faria |
| 5,069,780 A | 12/1991 | Thalmann et al. |
| 5,076,925 A | 12/1991 | Roesink et al. |
| 5,085,772 A | 2/1992 | Busch-Sorensen |
| 5,096,230 A | 3/1992 | Pausch et al. |
| 5,108,598 A | 4/1992 | Posner |
| 5,125,691 A | 6/1992 | Bogdan |
| 5,133,858 A | 7/1992 | Walz et al. |
| 5,139,668 A | 8/1992 | Pan et al. |
| 5,139,669 A | 8/1992 | Clermont et al. |
| RE34,050 E | 9/1992 | Thomsen et al. |
| 5,143,575 A | 9/1992 | Glässel et al. |
| 5,160,042 A | 11/1992 | Bikson et al. |
| 5,160,615 A | 11/1992 | Takagi et al. |
| 5,167,814 A | 12/1992 | Pulek |
| 5,167,837 A | 12/1992 | Snodgrass et al. |
| 5,172,998 A | 12/1992 | Hatagishi |
| 5,178,758 A | 1/1993 | Hwang |
| 5,180,490 A | 1/1993 | Eihusen et al. |
| 5,192,499 A | 3/1993 | Sakai et al. |
| 5,221,473 A | 6/1993 | Burrows |
| 5,230,760 A | 7/1993 | Tanabe |
| 5,230,812 A | 7/1993 | Williams |
| 5,262,068 A | 11/1993 | Bowers et al. |
| 5,262,069 A | 11/1993 | Kato |
| 5,316,347 A | 5/1994 | Arosio |
| 5,320,752 A | 6/1994 | Clack et al. |
| 5,324,483 A | 6/1994 | Cody et al. |
| 5,341,832 A | 8/1994 | Foust |
| 5,342,518 A | 8/1994 | Posner et al. |
| 5,344,194 A | 9/1994 | Hatagishi et al. |
| 5,373,595 A | 12/1994 | Johnson et al. |
| 5,380,437 A | 1/1995 | Bertoncini |
| 5,383,690 A | 1/1995 | Niemeier et al. |
| 5,387,339 A | 2/1995 | Lee et al. |
| 5,389,260 A | 2/1995 | Hemp et al. |
| 5,397,462 A | 3/1995 | Higashijima et al. |
| 5,397,468 A | 3/1995 | Chomka et al. |
| 5,399,263 A | 3/1995 | Chomka et al. |
| 5,401,401 A | 3/1995 | Chomka et al. |
| 5,413,711 A | 5/1995 | Janik |
| 5,417,459 A | 5/1995 | Gray et al. |
| 5,435,915 A | 7/1995 | Connors, Jr. |
| 5,437,483 A | 8/1995 | Umezawa |
| 5,449,454 A | 9/1995 | Hickok |
| 5,453,184 A | 9/1995 | Handtmann |
| 5,462,675 A | 10/1995 | Hopkins et al. |
| 5,468,388 A | 11/1995 | Goddard et al. |
| 5,468,390 A | 11/1995 | Crivello et al. |
| 5,474,683 A | 12/1995 | Bryant et al. |
| 5,478,119 A | 12/1995 | Dye |
| 5,486,288 A | 1/1996 | Stanford et al. |
| 5,505,842 A | 4/1996 | Enderle |
| 5,507,530 A | 4/1996 | Mahaney |
| 5,516,429 A | 5/1996 | Snodgrass et al. |
| 5,525,225 A | 6/1996 | Janik et al. |
| 5,558,371 A | 9/1996 | Lordo |
| 5,601,710 A | 2/1997 | Yoon et al. |
| 5,605,624 A | 2/1997 | Wright |
| 5,620,599 A | 4/1997 | Hopkins et al. |
| 5,632,894 A | 5/1997 | White et al. |
| 5,651,887 A | 7/1997 | Posner et al. |
| 5,667,679 A | 9/1997 | Bozenmayer et al. |
| 5,702,597 A | 12/1997 | Chevallet et al. |
| 5,725,623 A | 3/1998 | Bowerman et al. |
| 5,744,047 A | 4/1998 | Gsell et al. |
| 5,762,787 A | 6/1998 | Park et al. |
| 5,762,789 A | 6/1998 | de los Reyes et al. |
| 5,779,903 A | 7/1998 | Smith et al. |
| 5,782,791 A | 7/1998 | Peterson et al. |

| | | | |
|---|---|---|---|
| 5,816,621 A | 10/1998 | Frost | |
| 5,824,217 A | 10/1998 | Pearl et al. | |
| 5,842,724 A | 12/1998 | Kozinski et al. | |
| 5,842,888 A | 12/1998 | Belopolsky | |
| 5,858,224 A | 1/1999 | Schwandt et al. | |
| 5,911,879 A | 6/1999 | Eybergen | |
| 5,922,196 A | 7/1999 | Baumann | |
| 5,925,025 A | 7/1999 | Weilbacher et al. | |
| 5,927,759 A | 7/1999 | Hyslop | |
| 5,944,990 A | 8/1999 | Edens | |
| 5,951,862 A | 9/1999 | Bradford | |
| 5,984,371 A | 11/1999 | Mailleux | |
| 6,024,229 A | 2/2000 | Ayers | |
| D423,081 S | 4/2000 | Niermeyer | |
| 6,048,454 A | 4/2000 | Jenkins | |
| 6,059,318 A | 5/2000 | Estep et al. | |
| 6,059,797 A | 5/2000 | Mears | |
| 6,068,770 A | 5/2000 | Niermeyer et al. | |
| 6,139,738 A | 10/2000 | Maxwell | |
| 6,142,170 A | 11/2000 | Belfer et al. | |
| 6,159,366 A | 12/2000 | Carroll | |
| 6,176,904 B1 | 1/2001 | Gupta | |
| 6,251,270 B1 | 6/2001 | Blot-Carretero et al. | |
| 6,290,523 B1 | 9/2001 | Barnhart et al. | |
| 6,378,907 B1 | 4/2002 | Campbell et al. | |
| 6,387,271 B1 | 5/2002 | Geibel et al. | |
| 6,443,498 B1 | 9/2002 | Liao | |
| 6,447,023 B1 | 9/2002 | Grimm | |
| 6,523,861 B1 | 2/2003 | Clancy et al. | |
| 6,533,933 B1 | 3/2003 | Stankowski et al. | |
| 6,547,284 B2 | 4/2003 | Rose et al. | |
| 6,581,974 B1 | 6/2003 | Ragner et al. | |
| 6,634,509 B2 | 10/2003 | Ochi | |
| 6,733,250 B2 | 5/2004 | Yajima | |
| 6,752,159 B1 | 6/2004 | Kavadeles et al. | |
| 6,840,548 B2 | 1/2005 | Lacroix | |
| 6,902,671 B2 | 6/2005 | Cappia et al. | |
| 7,029,238 B1 | 4/2006 | Zagars et al. | |
| 7,163,037 B2 | 1/2007 | Walkowski | |
| 7,163,237 B2 * | 1/2007 | Niermeyer et al. | 285/26 |
| 7,407,594 B2 | 8/2008 | Laverdiere et al. | |
| 2002/0060189 A1 | 5/2002 | Conrad | |
| 2002/0163187 A1 | 11/2002 | Pelfrey et al. | |

FOREIGN PATENT DOCUMENTS

| | | |
|---|---|---|
| DE | 29618092 U1 | 12/1996 |
| DE | 197 17 054 A 1 | 11/1998 |
| EP | 0 231 862 A2 | 8/1987 |
| EP | 0269054 | 6/1988 |
| EP | 0390 715 A1 | 10/1990 |
| EP | 0 408 375 A2 | 1/1991 |
| EP | 0 492 627 A2 | 7/1992 |
| EP | 0 492 627 A3 | 7/1992 |
| EP | 0 535 546 A1 | 4/1993 |
| EP | 0 231 862 B1 | 5/1994 |
| EP | 0 616 826 A1 | 9/1994 |
| EP | 0 492 627 B1 | 6/1996 |
| EP | 0 815 928 A2 | 1/1998 |
| EP | 0 818 228 A1 | 1/1998 |
| EP | 0 887 100 A1 | 12/1998 |
| EP | 1 057 493 A2 | 12/2000 |
| FR | 2 633 368 A1 | 12/1989 |
| FR | 2 745 043 A1 | 8/1997 |
| GB | 344502 | 12/1929 |
| GB | 2 137 110 A | 10/1984 |
| GB | 2 314 516 A | 1/1998 |
| JP | 56-122893 A | 2/1980 |
| JP | 57-27588 A | 7/1980 |
| JP | 61-119686 A | 7/1986 |
| JP | 62-234512 A | 10/1987 |
| JP | 7-17434 A | 1/1991 |
| JP | 3-115092 | 11/1991 |
| JP | 5-154200 | 12/1991 |
| JP | 50154201 | 12/1991 |
| JP | 417805 | 2/1992 |
| JP | 4094705 | 3/1992 |
| JP | 52793 | 1/1993 |
| JP | 6-106164 A | 4/1994 |
| JP | 6-147383 | 5/1994 |
| JP | H6-39008 | 5/1994 |
| JP | 6042921 | 6/1994 |
| JP | 729003 | 4/1995 |
| JP | 7194905 A | 8/1995 |
| JP | 7232015 | 9/1995 |
| JP | 7110323 | 11/1995 |
| JP | 8024856 | 1/1996 |
| JP | 8052465 | 2/1996 |
| JP | 10005746 A | 1/1998 |
| JP | 200077588 | 3/2000 |
| WO | WO93-16315 A1 | 8/1993 |
| WO | 01/64312 A1 | 9/2001 |
| WO | WO 02/22232 A1 | 3/2002 |
| WO | WO 03/022388 A2 | 3/2003 |

OTHER PUBLICATIONS

Colder Products Company, St. Paul, Minnesota, "CPC Quick Couplings for Plastic Tubing," Form CP-1, Rev. 2 990; 4 pages, Sep. 1990.

Colder Products Comapny, St. Paul, Minnesota, "CPC Quick Couplings and Fittings for Plastic Tubing," 2 pages, Sep. 1990.

*Mykrolis Corporation* v. *Pall Corporation*, United States District Court, District of Massachusetts (Boston) Civil Docket # 1:03-cv-10392-GAO, pp. 1-11, Nov. 17, 2003.

Photoclean EZD, *Filtration of Photoresist, Organic Solvents, Developing Solution and Purified Water*,PALL, 1 page w/translation, Sep. 2, 1999.

Memorandum and Order dated Apr. 30, 2004, *Mykrolis Corporation* v. *Pall Corporation*, United States District Court, District of Massachusetts (Boston) Civil Docket # 1:03-10392-GAO, pp. 1-22.

Clarke, Michael E., "Understanding the Operating Cycles of Mykrolis Two-Stage Technology Photochemical Dispense Systems," Mykrolis Applications Notes, Lit. No. MAL 111, Mar. 1999.

Clarke, Michael E., "IMproving Photolithography Equipment OEE with the IMPACT® ST Manifold," Mykrolis Applications Notes, Lit. No. MAL 109, Mar. 1999.

Clarke, Michael E., Cheng, Kwok-Shun, "New Photochemical Filtration Technology for Process Improvement," Paper presented at the INTERFACE '97 Poster Session, San Diego, California, Nov. 10, 1997.

Exhibit 5, Pall's Preliminary Claim Chart Correlating Claim 3 of the '770 Patent to the Sumitomo '200 Publication, Aug. 2, 2004.

Exhibit 6, Pall's Preliminary Claim Chart Correlating Claim 1 of the '907 Patent to the Sumitomo '200 Publication, Aug. 2, 2004.

Exhibit 7, Pall's Preliminary Claim Chart Correlating Claim 3 of the '770 Patent to the Sumitomo '201 Publication, Aug. 2, 2004.

Pall Corporation's Notification of Additional Highly Significant Prior Art Impacting the Validity of the Mykrolis Patents and Request for *Sua Sponte* Dissolution of Preliminary Injunction, *Mykrolis* v. *Pall Corporation*, United States District Court, District of Massachusetts (Boston) Civil Docket No. 03-10392-GAO, dated Aug. 2, 2004.

Photograph of EZD-3 slotless retrofit manifold (slide-in version), Pall Production No. P011673, Oct. 26, 2004.

Photograph of EZD-3 slotless retrofit manifold (bolt-on version), Pall Production No. P011674, Oct. 26, 2004.

*Mykrolis Corporation* v. *Pall Corporation*, United States District Court, District of Massachusetts (Boston), Civil Action No.: 03-10392-GAO, Memorandum and Order dated Jan. 12, 2005.

Photograph of Sumitomo Oxygen Concentrator for Medical Treatment Use, MO-2000, Feb. 1993 (along with an English-language translation).

Photographs of MO-2000 Medical Oxygen Generator, as sold beginning in Feb. 1993.

Statement of Kuzukiyo Takano, Oct. 20, 2004 (along with English-language translation).

Millipore Corporation, "Wafergard™ Photoresist Filtration System," pp. 1-9, (Jun. 1983).

European Opposition Division decision to revoke European Patent EP-B-818228.

Pall's Opposition to Entegris' Motion for Preliminary Injunction, *Entegris, Inc.* v. *Pall Corporation*, United States District Court for the District of Massachusetts, Civil Action No. 06-10601 GAO, pp. 1-52.

Declaration of Professor Igor Paul, pp. 1-29, Exhibit 5 to Pall Corporation's Opposition to Entegris' Motion for Preliminary Injunction filed Jun. 1, 2006, Civil Action No. 06-10601 GAO.

Exhibit G, to Declaration of Professor Igor Paul, Exhibit 5 to Pall Corporation's Opposition to Entegris' Motion for Preliminary Injunction filed Jun. 1, 2006, Civil Action No. 06-10601 GAO.

Exhibit R, to Declaration of Professor Igor Paul, Exhibit 5 to Pall Corporation's Opposition to Entegris' Motion for Preliminary Injunction filed Jun. 1, 2006, Civil Action No. 06-10601 GAO.

Exhibit S, to Declaration of Professor Igor Paul, Exhibit 5 to Pall Corporation's Opposition to Entegris' Motion for Preliminary Injunction filed Jun. 1, 2006, Civil Action No. 06-10601 GAO.

Exhibit T, to Declaration of Professor Igor Paul, Exhibit 5 to Pall Corporation's Opposition to Entegris' Motion for Preliminary Injunction filed Jun. 1, 2006, Civil Action No. 06-10601 GAO.

Exhibit U, to Declaration of Professor Igor Paul, Exhibit 5 to Pall Corporation's Opposition to Entegris' Motion for Preliminary Injunction filed Jun. 1, 2006, Civil Action No. 06-10601 GAO.

Exhibit V, to Declaration of Professor Igor Paul, Exhibit 5 to Pall Corporation's Opposition to Entegris' Motion for Preliminary Injunction filed Jun. 1, 2006, Civil Action No. 06-10601 GAO.

Exhibit W, to Declaration of Professor Igor Paul, Exhibit 5 to Pall Corporation's Opposition to Entegris' Motion for Preliminary Injunction filed Jun. 1, 2006, Civil Action No. 06-10601 GAO.

Exhibit X, to Declaration of Professor Igor Paul, Exhibit 5 to Pall Corporation's Opposition to Entegris' Motion for Preliminary Injunction filed Jun. 1, 2006, Civil Action No. 06-10601 GAO.

Exhibit Y, to Declaration of Professor Igor Paul, Exhibit 5 to Pall Corporation's Opposition to Entegris' Motion for Preliminary Injunction filed Jun. 1, 2006, Civil Action No. 06-10601 GAO.

Declaration of Stephen Geibel, Exhibit 6 to Pall Corporation's Opposition to Entegris' Motion for Preliminary Injunction filed Jun. 1, 2006, Civil Action No. 06-10601 GAO.

Exhibit F, to Declaration of Stephen Geibel, Exhibit 6 to Pall Corporation's Opposition to Entegris' Motion for Preliminary Injunction filed Jun. 1, 2006, Civil Action No. 06-10601 GAO.

Exhibit G, to Declaration of Stephen Geibel, Exhibit 6 to Pall Corporation's Opposition to Entegris' Motion for Preliminary Injunction filed Jun. 1, 2006, Civil Action No. 06-10601 GAO.

Declaration of Michael Mesawich, Exhibit 7 to Pall Corporation's Opposition to Entegris's Motion for Preliminary Injunction filed Jun. 1, 2006, Civil Action No. 06-10601 GAO.

Exhibit A, to Declaration of Michael Mesawich, Exhibit 7 to Pall Corporation's Opposition to Entegris' Motion for Preliminary Injunction filed Jun. 1, 2006, Civil Action No. 06-10601 GAO.

Declaration of Dan Jenkins, Exhibit 8 to Pall Corporation's Opposition to Entegris' Motion for Preliminary Injunction filed Jun. 1, 2006, Civil Action No. 06-10601 GAO.

Exhibit B, to Declaration of Dan Jenkins, Exhibit 8 to Pall Corporation's Opposition to Entegris' Motion for Preliminary Injunction filed Jun. 1, 2006, Civil Action No. 06-10601 GAO.

Exhibit C, to Declaration of Dan Jenkins, Exhibit 8 to Pall Corporation's Opposition to Entegris' Motion for Preliminary Injunction filed Jun. 1, 2006, Civil Action No. 06-10601 GAO.

Exhibit D, to Declaration of Dan Jenkins, Exhibit 8 to Pall Corporation's Opposition to Entegris' Motion for Preliminary Injunction filed Jun. 1, 2006, Civil Action No. 06-10601 GAO.

Exhibit E, to Declaration of Dan Jenkins, Exhibit 8 to Pall Corporation's Opposition to Entegris' Motion for Preliminary Injunction filed Jun. 1, 2006, Civil Action No. 06-10601 GAO.

Exhibit F, to Declaration of Dan Jenkins, Exhibit 8 to Pall Corporation's Opposition to Entegris' Motion for Preliminary Injunction filed Jun. 1, 2006, Civil Action No. 06-10601 GAO.

Exhibit G, to Declaration of Dan Jenkins, Exhibit 8 to Pall Corporation's Opposition to Entegris' Motion for Preliminary Injunction filed Jun. 1, 2006, Civil Action No. 06-10601 GAO.

Exhibit H, to Declaration of Dan Jenkins, Exhibit 8 to Pall Corporation's Opposition to Entegris' Motion for Preliminary Injunction filed Jun. 1, 2006, Civil Action No. 06-10601 GAO.

Exhibit I, to Declaration of Dan Jenkins, Exhibit 8 to Pall Corporation's Opposition to Entegris' Motion for Preliminary Injunction filed Jun. 1, 2006, Civil Action No. 06-10601 GAO.

Exhibit J, to Declaration of Dan Jenkins, Exhibit 8 to Pall Corporation's Opposition to Entegris' Motion for Preliminary Injunction filed Jun. 1, 2006, Civil Action No. 06-10601 GAO.

Exhibit K, to Declaration of Dan Jenkins, Exhibit 8 to Pall Corporation's Opposition to Entegris' Motion for Preliminary Injunction filed Jun. 1, 2006, Civil Action No. 06-10601 GAO.

Exhibit L, to Declaration of Dan Jenkins, Exhibit 8 to Pall Corporation's Opposition to Entegris' Motion for Preliminary Injunction filed Jun. 1, 2006, Civil Action No. 06-10601 GAO.

Exhibit M, to Declaration of Dan Jenkins, Exhibit 8 to Pall Corporation's Opposition to Entegris' Motion for Preliminary Injunction filed Jun. 1, 2006, Civil Action No. 06-10601 GAO.

Exhibit N, to Declaration of Dan Jenkins, Exhibit 8 to Pall Corporation's Opposition to Entegris's Motion for Preliminary Injunction filed Jun. 1, 2006, Civil Action No. 06-10601 GAO.

Declaration of Frank Zugelter, Exhibit 9 to Pall Corporation's Opposition to Entegris' Motion for Preliminary Injunction filed Jun. 1, 2006, Civil Action No. 06-10601 GAO.

Exhibit B, to Declaration of Frank Zugelter, Exhibit 9 to Pall Corporation's Opposition to Entegris' Motion for Preliminary Injunction filed Jun. 1, 2006, Civil Action No. 06-10601 GAO.

Exhibit C, to Declaration of Frank Zugelter, Exhibit 9 to Pall Corporation's Opposition to Entegris' Motion for Preliminary Injunction filed Jun. 1, 2006, Civil Action No. 06-10601 GAO.

Exhibit D, to Declaration of Frank Zugelter, Exhibit 9 to Pall Corporation's Opposition to Entegris' Motion for Preliminary Injunction filed Jun. 1, 2006, Civil Action No. 06-10601 GAO.

Exhibit E, to Declaration of Frank Zugelter, Exhibit 9 to Pall Corporation's Opposition to Entegris' Motion for Preliminary Injunction filed Jun. 1, 2006, Civil Action No. 06-10601 GAO.

Exhibit F, to Declaration of Frank Zugelter, Exhibit 9 to Pall Corporation's Opposition to Entegris' Motion for Preliminary Injunction filed Jun. 1, 2006, Civil Action No. 06-10601 GAO.

Exhibit G, to Declaration of Frank Zugelter, Exhibit 9 to Pall Corporation's Opposition to Entegris' Motion for Preliminary Injunction filed Jun. 1, 2006, Civil Action No. 06-10601 GAO.

Pall's Revised Opposition to Entegris' Motion for Preliminary Injunction, *Entegris, Inc.* v. *Pall Corporation*, United States District Court for the District of Massachusetts, Civil Action No. 06-10601 GAO, pp. 1-49.

Entegris's Reply Brief in Support of Its Motion for Preliminary Injunction, *Entegris, Inc.* v. *Pall Corporation*, United States District Court for the District of Massachusetts, Civil Action No. 06-10601 GAO, pp. 1-46.

Affidavit of Michael Clarke in Support for Motion for Preliminary Injunction, *Entegris, Inc.* v. *Pall Corporation*, United States District Court for the District of Massachusetts, filed Jun. 22, 2006, Civil Action No. 06-10601 GAO.

Supplemental Affidavit of Samir Nayfeh in Support for Motion for Preliminary Injunction, *Entegris, Inc.* v. *Pall Corporation*, United States District Court for the District of Massachusetts, filed Jun. 22, 2006, Civil Action No. 06-10601 GAO.

Pall's Sur-Reply in Opposition to Entegris' Motion for Preliminary Injunction, *Entegris, Inc.* v. *Pall Corporation*, United States District Court for the District of Massachusetts, filed Jul. 7, 2006, Civil Action No. 06-10601 GAO.

Exhibit 13 to Supplemental Declaration of Professor Igor Paul to Pall Corporation's Sur-Reply in Opposition to Entegris' Motion for Preliminary Injunction, *Entegris, Inc.* v. *Pall Corporation*, United States District Court for the District of Massachusetts, filed Jul. 7, 2006, Civil Action No. 06-10601 GAO.

Exhibit AD to Supplemental Declaration of Professor Igor Paul, Exhibit 13, Part 1 to Pall Corporation's Sur-Reply in Opposition to Entegris' Motion for Preliminary Injunction, *Entegris, Inc.* v. *Pall Corporation*, United States District Court for the District of Massachusetts, filed Jul. 7, 2006, Civil Action No. 06-10601 GAO.

Exhibit AD to Supplemental Declaration of Professor Igor Paul, Exhibit 13, Part 2 to Pall Corporation's Sur-Reply in Opposition to Entegris' Motion for Preliminary Injunction, *Entegris, Inc.* v. *Pall Corporation*, United States District Court for the District of Massachusetts, filed Jul. 7, 2006, Civil Action No. 06-10601 GAO.

Exhibit AE to Supplemental Declaration of Professor Igor Paul, Exhibit 13 to Pall Corporation's Sur-Reply in Opposition to Entegris' Motion for Preliminary Injunction, *Entegris, Inc.* v. *Pall Corporation*, United States District Court for the District of Massachusetts, filed Jul. 7, 2006, Civil Action No. 06-10601 GAO.

Exhibit AF to Supplemental Declaration of Professor Igor Paul, Exhibit 13 to Pall Corporation's Sur-Reply in Opposition to Entegris' Motion for preliminary Injunction, *Entegris, Inc.* v. *Pall Corporation*, United States District Court for the District of Massachusetts, filed Jul. 7, 2006, Civil Action No. 06-10601 GAO.

Supplemental Declaration of Stephen A. Geibel, Exhibit 14 to Pall Corporation's Sur-Reply in Opposition to Entegris' Motion for Preliminary Injunction, *Entegris, Inc.* v. *Pall Corporation*, United States District Court for the District of Massachusetts, filed Jul. 7, 2006, Civil Action No. 06-10601 GAO.

Exhibit I to Supplemental Declaration of Stephen A. Geibel, Exhibit 14 to Pall Corporation's Sur-Reply in Opposition to Entegris' Motion for Preliminary Injunction, *Entegris, Inc.* v. *Pall Corporation*, United States District Court for the District of Massachusetts, filed Jul. 7, 2006, Civil Action No. 06-10601 GAO.

Exhibit J to Supplemental Declaration of Stephen A. Geibel, Exhibit 14 to Pall Corporation's Sur-Reply in Opposition to Entegris' Motion for Preliminary Injunction, *Entegris, Inc.* v. *Pall Corporation*, United States District Court for the District of Massachusetts, filed Jul. 7, 2006, Civil Action No. 06-10601 GAO.

Exhibit K to Supplemental Declaration of Stephen A. Geibel, Exhibit 14 to Pall Corporation's Sur-Reply in Opposition to Entegris' Motion for Preliminary Injunction, *Entegris, Inc.* v. *Pall Corporation*, United States District Court for the District of Massachusetts, filed Jul. 7, 2006, Civil Action No. 06-10601 GAO.

Exhibit L to Supplemental Declaration of Stephen A. Geibel, Exhibit 14 to Pall Corporation's Sur-Reply in Opposition to Entegris' Motion for Preliminary Injunction, *Entegris, Inc.* v. *Pall Corporation*, United States District Court for the District of Massachusetts, filed Jul. 7, 2006, Civil Action No. 06-10601 GAO.

Exhibit M to Supplemental Declaration of Stephen A. Geibel, Exhibit 14 to Pall Corporation's Sur-Reply in Opposition to Entegris' Motion for Preliminary Injunction, *Entegris, Inc.* v. *Pall Corporation*, United States District Court for the District of Massachusetts, filed Jul. 7, 2006, Civil Action No. 06-10601 GAO.

Excerpts from Entegris Appeal Brief, Exhibit 15 to Pall Corporation's Sur-Reply in Opposition to Entegris' Motion for Preliminary Injunction, *Entegris, Inc.* v. *Pall Corporation*, United States District Court for the District of Massachusetts, filed Jul. 7, 2006, Civil Action No. 06-10601 GAO.

Family Tree of the '667 Patent, Exhibit 16 to Pall Corporation's Sur-Reply in Opposition to Entegris' Motion for Preliminary Injunction, *Entegris, Inc.* v. *Pall Corporation*, United States District Court for the District of Massachusetts, filed Jul. 7, 2006, Civil Action No. 06-10601 GAO.

Entegris, Inc.'s Response to Pall Corporation's Sur-Reply, *Entegris, Inc.* v. *Pall Corporation*, United States District Court for the District of Massachusetts, filed Jul. 14, 2006, Civil Action No. 06-10601 GAO, pp. 1-8.

Second Supplemental Affidavit of Samir Nayfeh in Support for Motion for Preliminary Injunction, *Entegris, Inc.* v. *Pall Corporation*, United States District Court for the District of Massachusetts, filed Jul. 14, 2006, Civil Action No. 06-10601 GAO, pp. 1-4.

Supplemental Affidavit of Michael Clarke in Support for Motion for Preliminary Injunction, *Entegris, Inc.* v. *Pall Corporation*, United States District Court for the District of Massachusetts, filed Jul. 14, 2006, Civil Action No. 06-10601 GAO, pp. 1-7.

\* cited by examiner

RECEPTOR FOR A SEPARATION MODULE

RELATED APPLICATIONS

This application is a continuation of U.S. Application No. 10/489,587, filed Mar. 12, 2004, now issued as U.S. Pat. No. 7,163,237 B2, which is the U.S. National Stage of International application No. PCT/US02/29107, filed on Sep. 13, 2002, published in English, which claims the benefit of U.S. Provisional Application No. 60/322,002, filed on Sep. 13, 2001. The entire teachings of the above applications are incorporated herein by reference.

BACKGROUND OF THE INVENTION

This invention relates to a separation module for purifying a fluid. Fluid separation devices having an easily replaceable and disposable fluid separation module have been used to control contamination in industrial processes for many years. Such devices are an integral part of the manufacture of many products including pharmaceuticals, food stuffs and beverages. However, nowhere is the need for effective contamination control greater than in the semiconductor fabrication industry. With circuit details in the submicron range and with further feature size reductions inevitable, the need for control of particulate, ionic, organic and other contaminants in the semiconductor process fluids is essential. Also, because semiconductor devices are fabricated in clean rooms, it is important to minimize the potential of contaminating the manufacturing environment. For this reason, disposable fluid separation devices are preferable in semiconductor fabrication processes in order to minimize contamination of the process lines as well as the clean room.

Examples of semiconductor process fluids which are processed at the point of use (POU) include those chemicals used in photolithographic processing (photochemicals). Photochemicals include materials such as primers, adhesion promoters, photoresists, edge bead removers, antireflective coatings, developers, dielectrics, and the like. Such chemicals are commonly dispensed onto the silicon wafer by a specialized pump and subsequently dispersed into a uniform thin film using a process called spin coating. The purity of these chemicals at the POU is essential to producing acceptable product yields.

Fluid separation devices are in general of two types. In the first type, the separation element such as a filter is a replaceable component, while the pressure vessel which houses the element, i.e., the housing, is reusable. The housing also contains appropriate fluid connections to the rest of the fluid processing system. Replacing the fluid separation element requires opening the housing, removing the separation element, installing the replacement separation element into the housing and closing the housing. There are many disadvantages to this type of fluid separation device. First, the replacement operation is time consuming, especially if access to the housing is restricted. Secondly, because the housing contains a quantity of the fluid being processed and because the fluid separation element is usually saturated with the fluid, spillage of the fluid usually occurs. In the case of hazardous fluids, spills can be a threat to the well-being of personnel in the area as well as potentially damaging to nearby equipment and facilities. Finally, the opening of the housing exposes the internal surfaces of the fluid processing system to unwanted contamination from the surrounding environment.

The second type of separation device is one in which the separation element is permanently attached to the housing, which also contains appropriate fluid connections to the rest of the fluid processing system, to form an integrated module. In this case, replacement involves disconnecting the entire separation module from the fluid processing system and reconnecting a replacement module to the system. In this manner, replacement is easier, exposure of the operator to hazardous chemicals is minimized and the reliability of the connection is significantly improved. The type of separation device is referred to as a disposable module, since the whole module is removed and disposed of whenever the separation element requires replacement regardless of what connector design is employed. Disposable modules usually require that multiple connections be made sequentially, a minimum of two connections, and more typically three or four. Threaded fasteners are cumbersome and sometimes difficult to engage; factors which involve the subsequent consumption of additional time and effort. Furthermore, the module has to be held in place while the connections are being made, which makes the connection event even more difficult since it requires performing two actions at the same time (i.e., holding the module in place and attaching each connector sequentially). Finally, in those applications in which the permanent connections to the fluid processing system are not rigid, as for example, when the flexible tubing is used, liquid has a tendency to be discharged as the connections disengage. All of these problems exacerbate the time and effort required to replace a disposable module, in addition to still allowing for exposure of personnel to hazardous materials, and contamination of the manufacturing environment.

For these reasons, some disposable separation modules have been designed with features that allow them to be connected quickly and easily to the fluid processing system in a "quick-connect" fashion. These types of quick-connect modules provide for a set of connectors that sealingly engage with a single, simple stroke or action, to a mating set of connectors attached to a reusable substrate. Different types of mechanisms have been designed to accomplish quick-connect retention, all of which heretofore have required some form of relative motion between the male connector and its female counterpart, most commonly a twisting action.

It has also been proposed to provide a separation module in a system for dispensing a filtered fluid composition wherein the separation module is introduced into a pivotable housing to effect a desired connection. The pivotable housing is expensive and is subjected to breakage over time due to excessive use.

Accordingly, it would be desirable to provide a separation module which can be replaced in a fluid separation system without the need of a pivotable housing.

SUMMARY OF THE INVENTION

The separation module of this invention fits into a stationary receptor having a shelf which functions as a pivot line and a slot which receives and retains a latch of the separation module. The separation module includes a curved surface which fits onto the pivot line of the stationary receptor and a latch which cooperates with the slot of the stationary receptor to retain the separation module within the stationary receptor. The separation module includes a filter positioned within a housing of the separation module and fittings which connect a source of fluid to be purified to a point of use for the fluid being purified within the separation module. In one embodiment, the separation module is positioned in a portable manifold having fluid fittings which permit the use of the separation module in fluid transfer systems having a variety of functions.

DETAILED DESCRIPTION OF THE INVENTION

The separation module of this invention is useful for purifying a fluid from a fluid dispensing system which includes a pump. The fluid dispensing system can includes a single pump or a plurality of pumps such as a two pump system comprising a dispensing pump and a feed pump. Such a system, when dispensing a fluid, includes the separation module of this invention having a separation element which separates unwanted components of the fluid from the desired fluid composition.

The present invention will be particularly described herein with reference to a two pump fluid dispensing system including a feed pump, a dispensing pump and a separation module having a particular configuration of inlet means and outlet means. However, it is to be understood that the present invention can be utilized in a fluid dispensing system having a separation module regardless of the outer surface configuration of inlet means and outlet means on the surface of the separation module.

Figure 1:
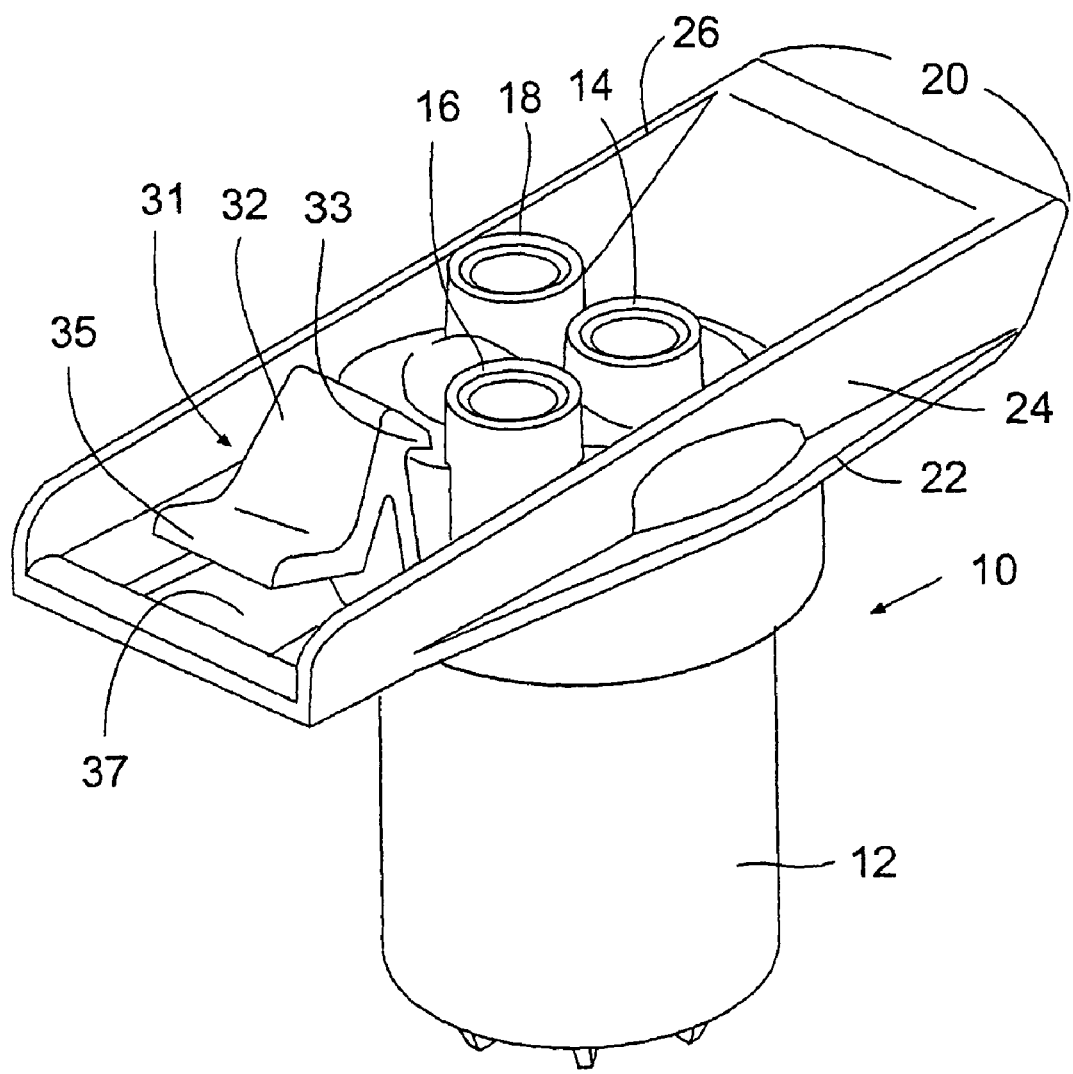
FIG. 1 is a perspective view of a separation module of this invention.
Figure 4:
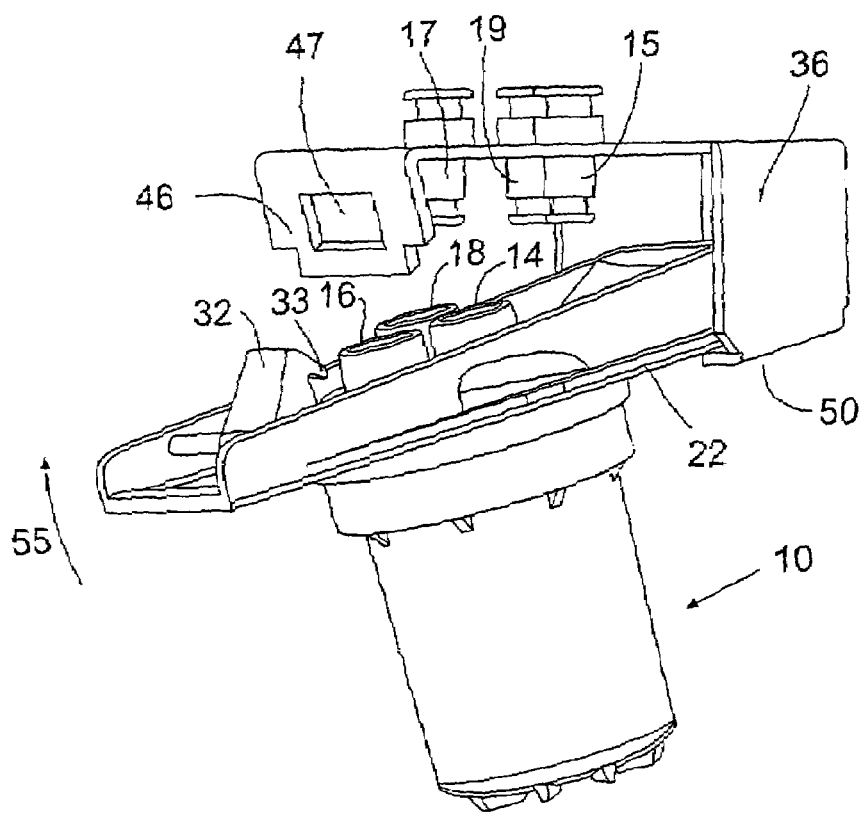
FIG. 4 is a side view of the separation module of FIG. 1 in the stationary receptor of FIG. 2.

Referring to FIG. 1, the separation module 10 of this invention includes a housing 12 for a filter construction such as a pleated filter, a depth filter, hollow fibers or the like. Ports 14, 16 and 18 fit over mating fittings, 15, 17 and 19 (FIG. 4). Housing 66 (FIG. 5) which contains a feed pump and a dispense pump such as that disclosed in U.S. Pat. No. 5,263,069 which is incorporated herein by reference. Port 14 can be an inlet for fluid to be filtered. Port 16 can be an outlet for retentate. Port 18 can be an outlet for filtered fluid directed to a point of use. The separation module 10 includes a pivot surface 20 which extends substantially the complete width of the separation module 10 and two flanges 22 (one shown) which are positioned on opposing surfaces of the separation module 10 and which are attached to walls 24 and 26.

The separation module 10 is provided with a latch 31 having a vertical arm 32, a hook 33 and a leaver 35. The latch 31 is secured to the separator module 10 such as by being molded with the walls of slot 37. The slot 37 permits movement of latch 31 when a force is applied to lever 35, such as manual force.

Figure 2:
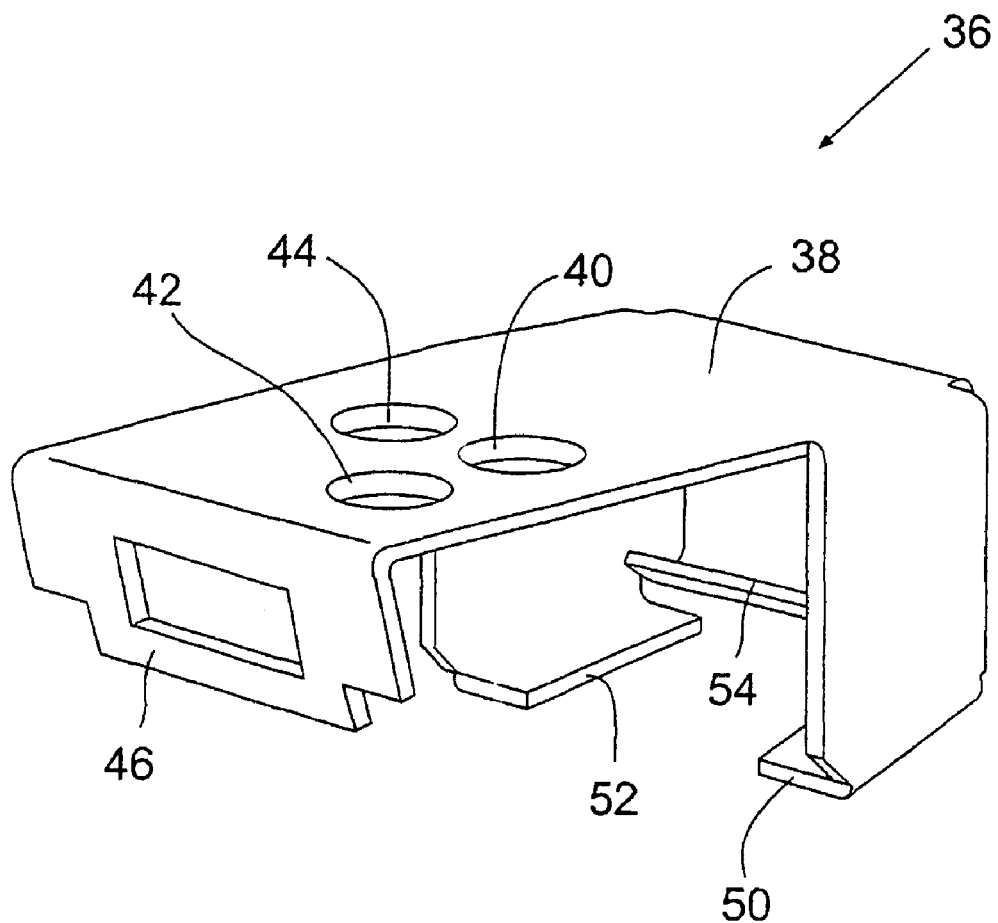
FIG. 2 is a perspective view of a stationary receptor utilized in conjunction with the separation module of FIG. 1.

Referring to FIG. 2, the stationary receptor 36 includes a top surface 38 having holes 40, 42 and 44 through which fittings 15, 17 and 19 (FIG. 4) from a manifold extend. The stationary receptor 36 includes a flange 46 having an opening 47 which cooperates with vertical arm 32 and hook 33 of latch 31. The stationary receptor 36 also includes shelves 50 and 52 onto which flanges 22 of separation module 10 slide, as well as receptor pivot surface 54 onto which pivot surface 20 fits.

Figure 3A:
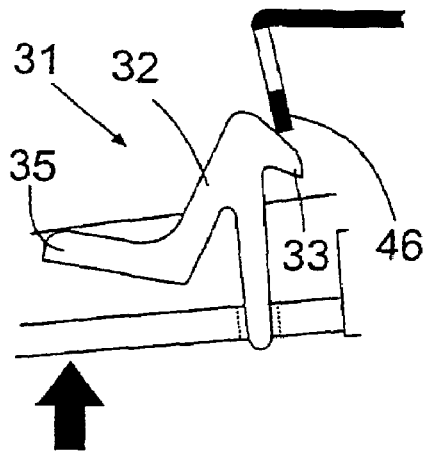
FIGS. 3a, 3b, 3c and 3d are side view illustrating the use of a latch of the separation module of FIG. 1.
Figure 3B:
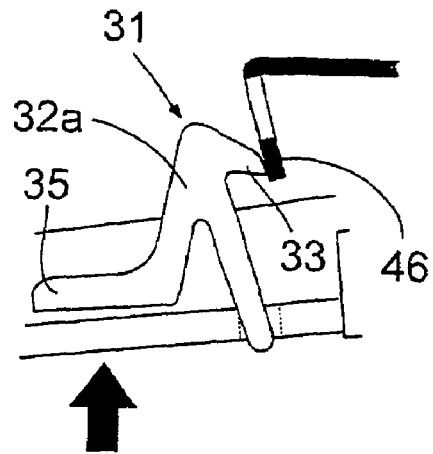
Figure 3C:
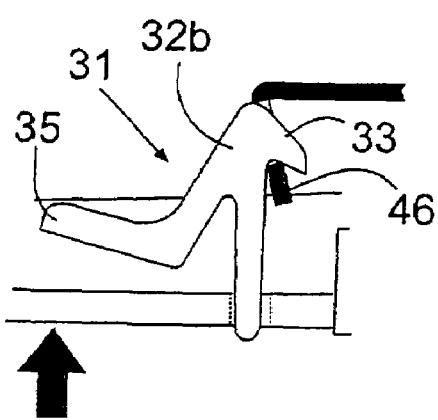
Figure 3D:
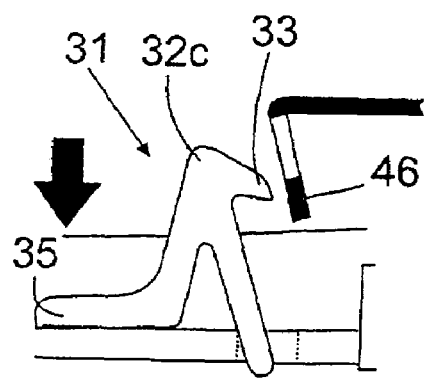

Referring to FIGS. 3a, 3b, 3c and 3d, the latch 31 in its initial position is shown in FIG. 3a. As shown in FIG. 3b, a force in the direction of the arrow causes hook 33 to move away from flange 46. As shown in FIG. 3c, the latch 31 is moved upwardly by moving filtrate module 10 upwardly so that the hook 33 fits onto flange 46. This latch position fixes the filtration module 10 to stationary module 36. As shown in FIG. 3d, the hook 33 is removed from flange 46 by applying a force to lever 35 as shown by the arrow. When latch 31 in the position shown in FIG. 3d, separation module 10 can be removed from stationary receptor 36.

As shown in FIGS. 2 and 4, separation module 10 is slid into stationary receptor 36 onto slides 50 and 52 until pivot line 20 is positioned on pivot surface 54. When separation module 10 is so positioned, ports 14, 16 and 18 are positioned to fit over fittings 15, 17 and 19 when separation module 10 is rotated upwardly as indicated by arrow 55. By virtue of this upward movement, arm 32 is locked onto flange 46 and hook 33 extends through the opening 47. This, in turn, locks separation module 10 into stationary receptor 36 so that leak-free fluid transfer can be affected between ports 14, 16 and 18 and fittings 15, 17 and 19.

Figure 5:
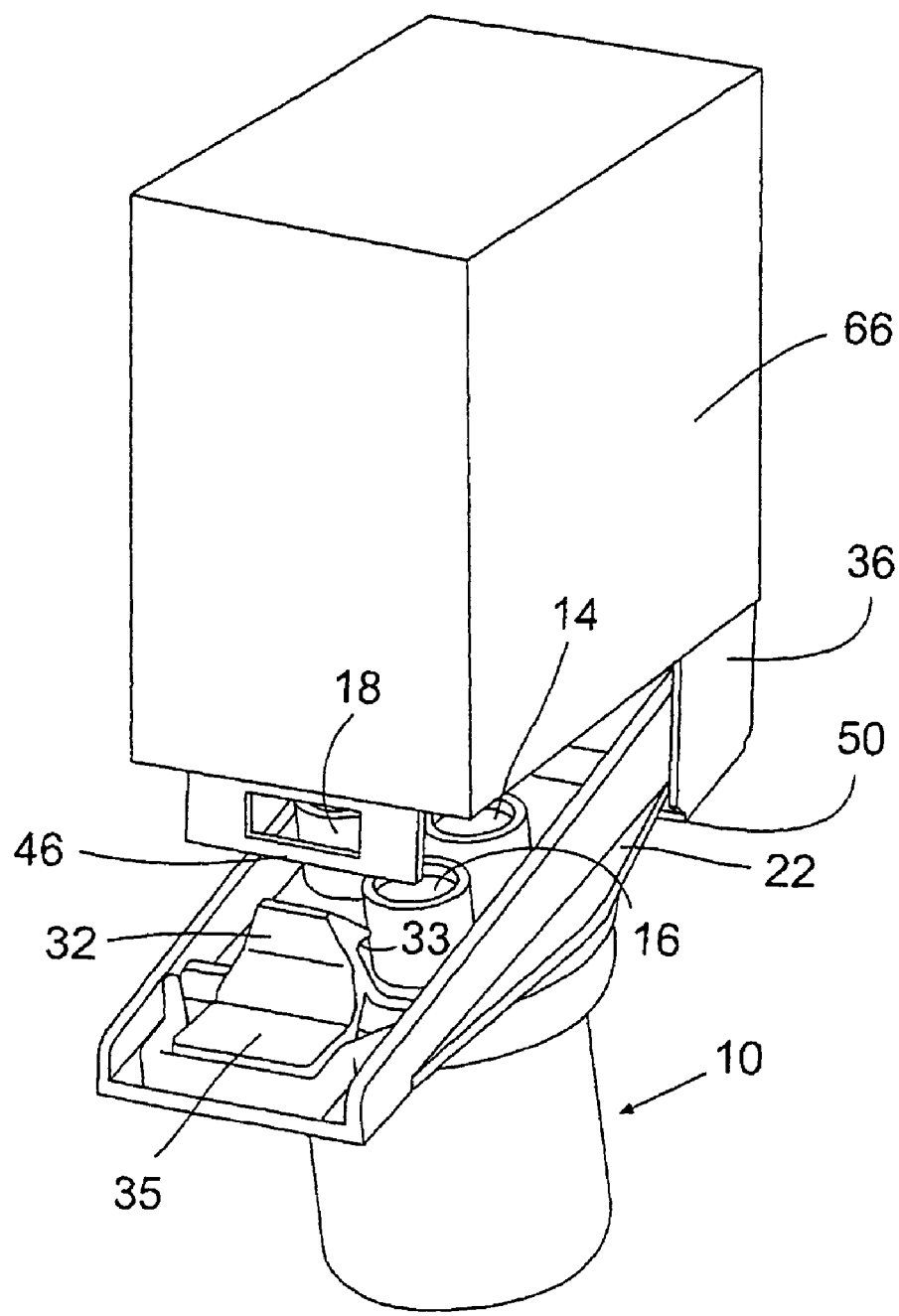
FIG. 5 is a perspective view of the apparatus of FIG. 4 attached to a pump housing.

As shown in FIG. 5, the stationary receptor 36 is attached to a pump housing containing one or more a plurality of pumps in a manner well known in the art. The fittings 14, 16 and 18 are sealed to mating fittings such as described above.

Figure 6:
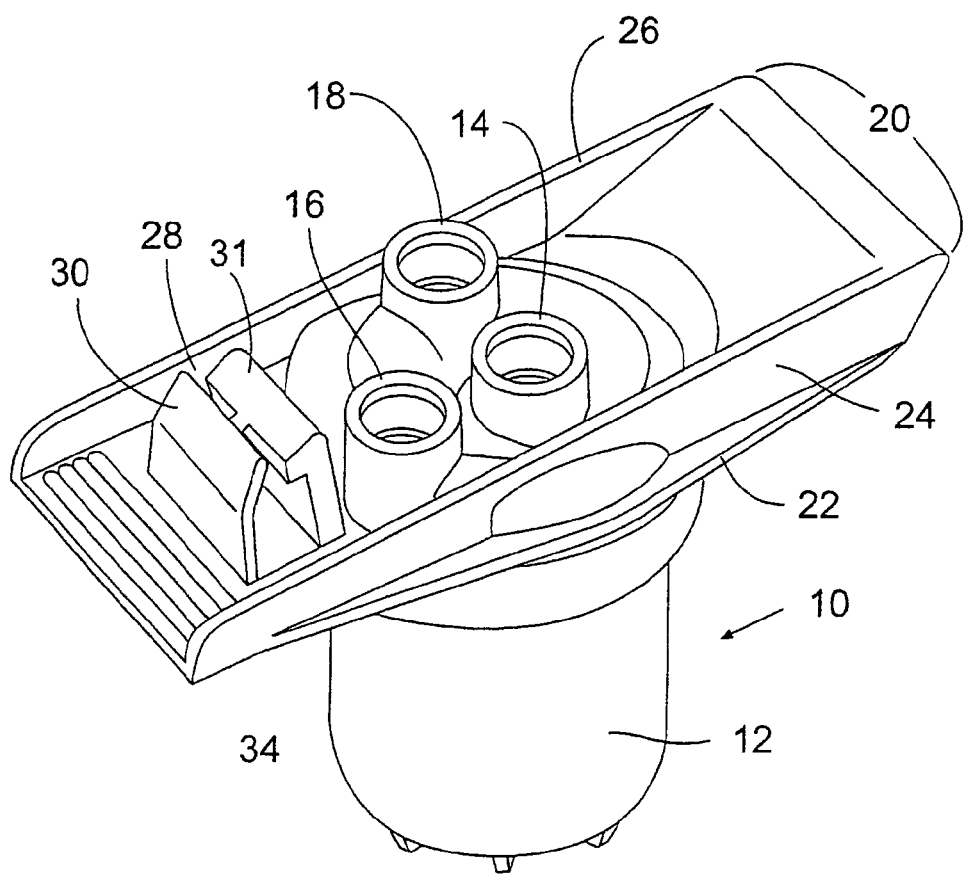
FIG. 6 illustrates an alternative separation module of this invention.

As shown in FIG. 6, the separation module 10 can be provided with a latch 28 comprising two arms 30 and 31. Arm 31 is provided with lip 34 which cooperates with the bracket of FIG. 2 as described below. The arms 30 and 31 are sufficiently flexible so that the arm 31 can be pushed by arm 30, which in turn, is pushed manually sequentially in order to engage or remove arm 31 from contact with flange 46 of bracket 36 and thereby to permit removal of separation module 10 from bracket 36.

Figure 7:
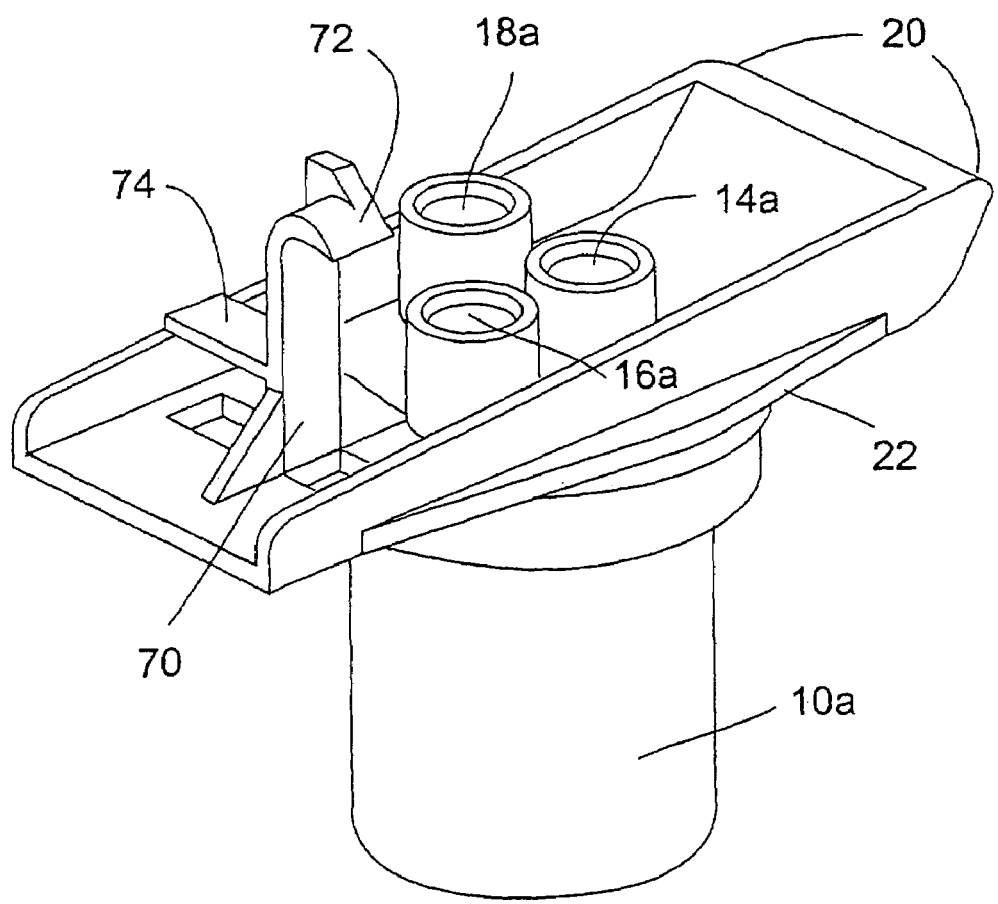
FIG. 7 illustrates an alternative separation module of this invention.

An alternative embodiment of a separation module of this invention is shown in FIG. 7. The separation module 10a having ports 14a, 16a and 18a, also is provided with two shelves 22 and a pivot line 20 in the manner described above with reference to FIG. 1. The latch 70 includes a lip 72 and an arm 74. The lip 72 is configured to fit into a stationary receptor and the lever 74 permits application of manual force in order to remove lip 72 from the stationary receptor thereby to install and remove the separation module 10 a from the stationary receptor in the manner described above with the reference to FIGS. 3a-3d.

Figure 8:
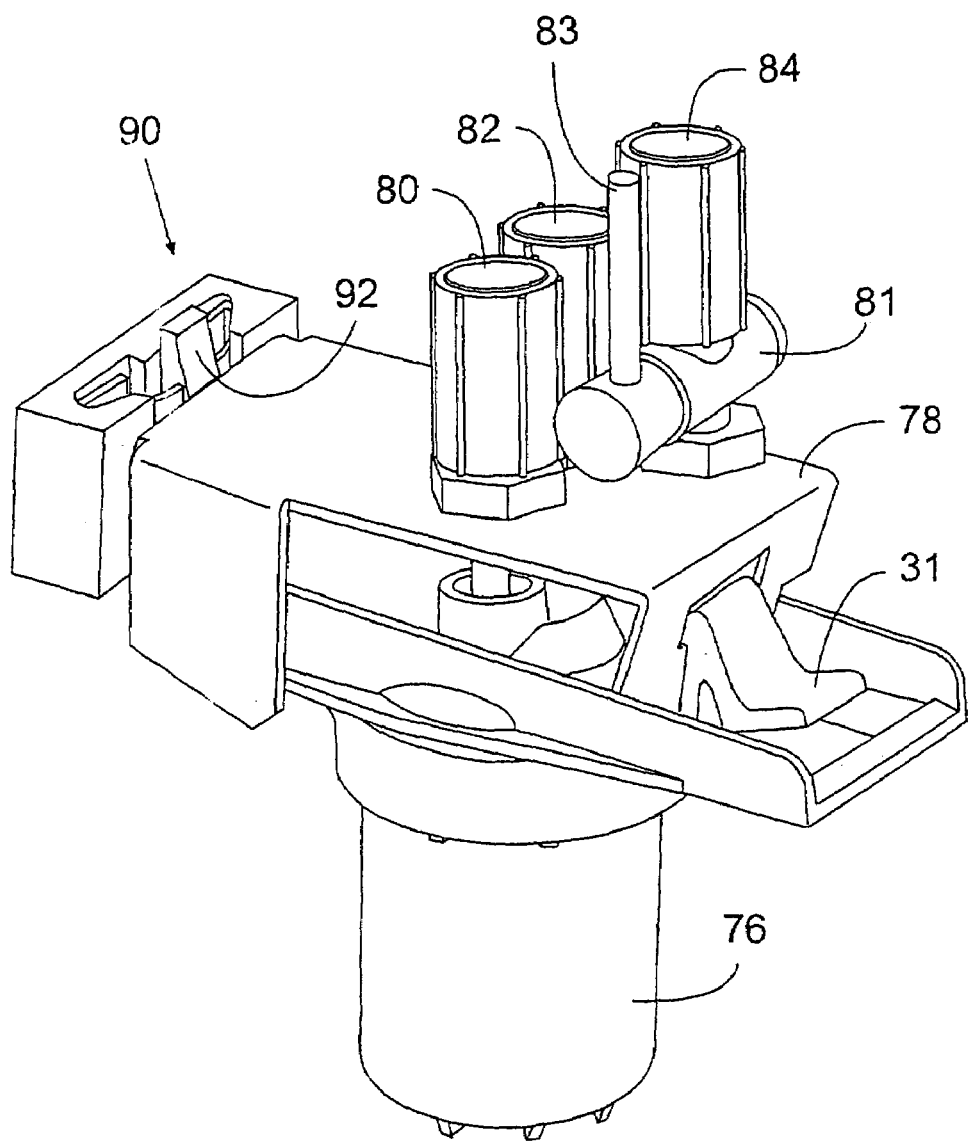
FIG. 8 is a perspective view of a portable stationary module and separation module of this invention.

Referring to FIG. 8, an embodiment of this invention is illustrated which comprises a portable unit of separation module 76 and the stationary receptor 78 that is portable. The separation module 76 and stationary receptor 78 are joined by latch 31 in the manner described above with reference to FIGS. 3a-3d. The stationary receptor 78 is provided with fittings 80, 82 and 84 which can be mated with a pumping apparatus (not shown). The stationary receptor 78 is joined to a mounting 88 that can be mounted to a wall 90 by a latch 92. This embodiment facilitates installation of stationary receptor 78. The stationary receptor 78 can include a valve 81 having a manually activated apparatus lever 83 for opening or closing the valve 81 to permit or prevent fluid transfer through fittings.

What is claimed is:

1. A receptor configured to receive a complementary separation module, the receptor comprising:

a stationary body comprising a pivot surface, a flange, a plurality of support surfaces, and at least two fluid connectors;

the pivot surface being configured to enable pivoting of the separation module into a locked position;

the flange including an opening configured to receive a latch fixed to the separation module when the separation module is in the locked position;

the plurality of support surfaces being positioned to contact, by sliding planar surface contact, a plurality of flanges of a housing of the separation module, and being positioned to support the plurality of flanges from beneath by such sliding planar surface contact as the separation module is slid into the receptor to bring a pivot surface of the housing of the separation module into contact with the pivot surface of the receptor prior to pivoting the separation module into the locked position; and the at least two fluid connectors being exclusive of one another and complementary to fluid connectors of said separation module, wherein the fluid connectors of the receptor are positioned to be sealed in fluid communication with the fluid connectors of said separation module when the separation module is pivoted into the locked position.

2. The receptor of claim 1, further comprising a third fluid connector complementary to a third fluid connector on a separation module.

3. The receptor of claim 1, wherein the receptor is fixed to a pumping apparatus.

4. The receptor of claim 1, further comprising a mounting configured to be slidably fixed to a wall.

* * * * *